United States Patent
Barash et al.

(10) Patent No.: US 12,314,589 B2
(45) Date of Patent: May 27, 2025

(54) FILESYSTEM OPERATIONS IN STORAGE DEVICES

(71) Applicant: HEWLETT PACKARD ENTERPRISE DEVELOPMENT LP, Spring, TX (US)

(72) Inventors: Gil Barash, Tel Aviv (IL); Shlomi Apel, Herzliya (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/495,142

(22) Filed: Oct. 26, 2023

(65) Prior Publication Data
US 2025/0138739 A1    May 1, 2025

(51) Int. Cl.
*G06F 3/06* (2006.01)

(52) U.S. Cl.
CPC .............. *G06F 3/064* (2013.01); *G06F 3/065* (2013.01); *G06F 3/061* (2013.01); *G06F 3/0679* (2013.01)

(58) Field of Classification Search
CPC .......... G06F 3/064; G06F 3/065; G06F 3/061; G06F 3/0679
USPC .................................................. 711/154, 100
See application file for complete search history.

(56) References Cited

U.S. PATENT DOCUMENTS

| | | | |
|---|---|---|---|
| 7,194,563 B2 | 3/2007 | Plourde, Jr. | |
| 7,551,832 B2 | 6/2009 | Plourde, Jr. | |
| 7,831,789 B1 | 11/2010 | Per et al. | |
| 8,650,229 B2 | 2/2014 | Fuentes, II | |
| 9,317,511 B2 | 4/2016 | Kanfi | |
| 9,658,929 B1* | 5/2017 | Natanzon | G06F 3/065 |
| 10,228,854 B2 | 3/2019 | Romanovsky et al. | |
| 10,628,263 B1 | 4/2020 | Cowen et al. | |
| 2020/0110537 A1* | 4/2020 | Hahn | G06F 3/061 |
| 2020/0364105 A1 | 11/2020 | Carey et al. | |
| 2020/0364190 A1 | 11/2020 | Das et al. | |

OTHER PUBLICATIONS

Michael Buckbee, "Complete Guide to Windows File System Auditing—Varonis," Jun. 23, 2023, <https://www.varonis.com/blog/windows-file-system-auditing>, 23 pages.

(Continued)

*Primary Examiner* — Hosain T Alam
*Assistant Examiner* — Zubair Ahmed
(74) *Attorney, Agent, or Firm* — Trop, Pruner & Hu, P.C.

(57) ABSTRACT

Example implementations relate to data storage. An example includes inspecting a block level input/output (I/O) request to be executed by a block-based storage device, and in response to a determination that the block level I/O request includes a filesystem operation, generating a copy of the block level I/O request. The example also includes parsing the copy of the block level I/O request to extract a plurality of attributes of the filesystem operation, where the parsing is asynchronous to an execution of the block level I/O request by the block-based storage device. The example also includes storing the extracted plurality of attributes of the filesystem operation in an entry of a filesystem operation database, where each entry of the filesystem operation database is associated with a different filesystem operation in a filesystem stored on the block-based storage device.

20 Claims, 8 Drawing Sheets

(56) References Cited

OTHER PUBLICATIONS

Saraswathi et al., "Distributed deduplication with fingerprint index management model for big data storage in the cloud," Apr. 2, 2020, Evol. Intel. vol. 14, pp. 683-690 (2021).
Sun et al., "Spiffy: Enabling File-System Aware Storage Applications", 16th USENIX Conference on File and Storage Technologies, Feb. 12-15, 2018, 14 pages.
Sun et al., "Spiffy: Enabling File-System Aware Storage Applications," Feb. 2018, 16th USENIX Conference on File and Storage Technologies, 62 pages.

\* cited by examiner

| FSO Queue 210 |
|---|
| I/O Req-1 |
| I/O Req-2 |
| I/O Req-3 |
| I/O Req-4 |
|  |

FIG. 2A

| FSO Database 220 ||||||
|---|---|---|---|---|
| FSO ID | Element | Type | Time | Parent |
| 1 | File1 | Create | Time1 | Directory2 |
| 2 | File3 | Modify | Time2 | Directory2 |
| 3 | Directory6 | Create | Time3 | Directory1 |
| 4 | File2 | Delete | Time4 | Directory6 |
| ⋮ | ⋮ | ⋮ | ⋮ | ⋮ |
| N | Directory11 | Modify | TimeN | Directory6 |

FILESYSTEM OPERATIONS IN STORAGE DEVICES

BACKGROUND

Computing devices may include components such as a processor, memory, caching system, and storage device. The storage device may include a hard disk drive that uses a magnetic medium to store and retrieve data blocks. Some storage systems may transfer data between different locations or devices. For example, some systems may transfer and store copies of important data for archival and recovery purposes.

BRIEF DESCRIPTION OF THE DRAWINGS

Some implementations are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a computing system may persistently store data in one or more storage devices. For example, a server may store a collection of data on a local storage array, and may also store a backup copy of the collection of data in a remote backup device. In some examples, the backup copy may be stored in a different form than the collection of data. For example, the backup copy may comprise a deduplicated representation of the collection of data. As used herein, a "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof. As used herein, a "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a collection of data may be specified in terms of one or more elements of a filesystem. As used herein, a "filesystem" is a system for organizing data that is stored in a storage device. For example, a filesystem may include a collection of data files stored in a hierarchy of directories (e.g., including a root directory and one or more levels of sub-directories). In order to present the data as a collection of data files and directories, the filesystem may maintain structures of metadata. The term "metadata," in the context of a filesystem, refers to information that describes volumes, files and directories, but this information is not part of the stored data files. For example, the following information items describe a data file and are considered as part of the file's metadata: a file name, file size, creation time, last access/write time, user id, and block pointers that point to the actual data of the file on a storage device. Information items that compose metadata of a directory mainly include names and references to data files and sub-directories included in the directory. As used herein, a "filesystem operation" may refer to an operation to modify the elements of a filesystem (e.g., files and directories). For example, a filesystem operation may include adding a filesystem element, deleting a filesystem element, altering a filesystem element, and so forth.

In some examples, a collection of data may be stored on a block-based storage device. As used herein, a "block-based" storage device may refer to a device that stores data at a block level. In examples described herein, the term "block level" refers to a level of data storage that is below a file and directory level of data storage. In such examples, a block level may be a level at which a block-based storage device (e.g., a hard disk drive (HDD), solid state drive (SSD), or the like) or a virtual volume, for example, may store data thereon, and a level upon which files and directories are implemented by a filesystem. The block-based storage device may receive the data blocks making up a collection of data as a stream of data blocks.

In some examples, a block-based storage device may store a filesystem in the form of data blocks. Further, different types of data blocks (e.g., including the file data and the metadata of the filesystem) may be stored in different portions or locations of the block-based storage device. For example, in the case of a New Technology File System (NTFS) filesystem, the data blocks including the filesystem metadata may be stored in a Master File Table (MFT) of the block-based storage device, and the data blocks including the file data may be stored in a different portion of the block-based storage device.

In some examples, a filesystem operation may be performed by sending one or more block level input/output (I/O) requests to a block-based storage device. The block-based storage device may execute the block level I/O requests, but may not have visibility of the filesystem operation itself. For example, if the filesystem operation is to move a data file to a new directory, the block-based storage device may receive a block level I/O request to modify the data blocks including the corresponding metadata (e.g., the metadata recording the current location of the data file). However, in this example, the block-based storage device may not parse a filesystem operation that is embedded in the block level I/O request, and therefore may not have visibility of the movement of the data file to the new directory. As such, identifying the changes to the filesystem that occurred at various points in time may require periodic processing to parse and analyze the entire filesystem, and may thereby negatively impact the performance of the block-based storage device.

In accordance with some implementations of the present disclosure, a controller may inspect a block level I/O request being sent to a block-based storage device, and may determine whether the block level I/O request includes a filesystem operation. Upon determining that the block level I/O request includes a filesystem operation, the block level I/O request is copied into a queue. The controller may dequeue the copy of the block level I/O request asynchronously from the execution of the block level I/O request. Further, the controller may parse the dequeued copy of block level I/O request to extract details of the included filesystem operation. The controller may then add the extracted information to a database of filesystem changes. Subsequently, the database may be queried to identify particular changes to the filesystem. For example, the database may be queried to determine when a particular file was changed, to rapidly detect mass changes to multiple files (e.g., indicating a malware attack), and so forth. In this manner, the database may provide visibility of filesystem changes without repeated executions of programming to parse and analyze the entire filesystem, and may thereby improve the performance of the block-based storage device. Various aspects of the disclosed technique are discussed further below with reference to FIGS. 1A-8.

Figure 1A:
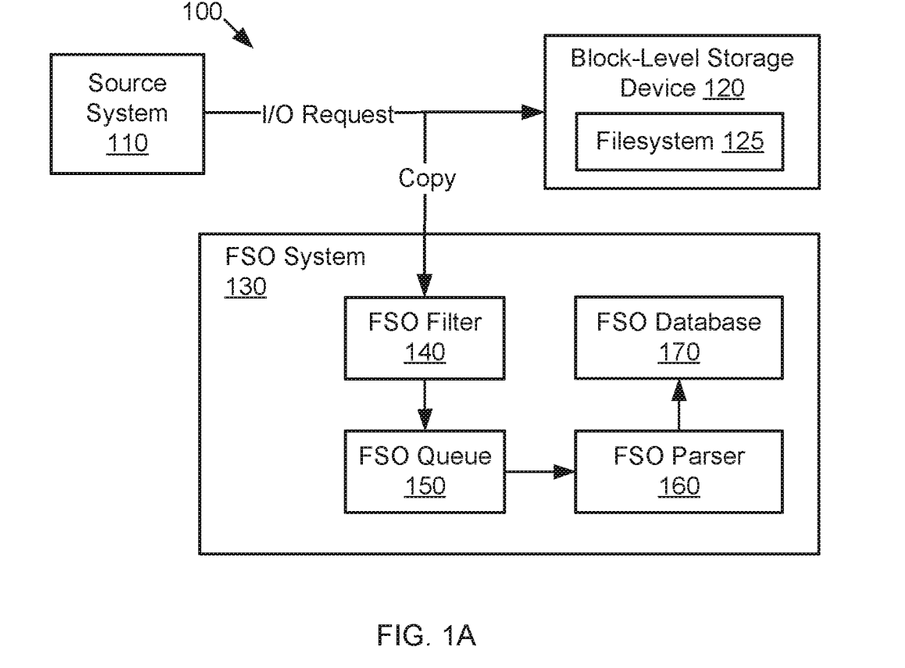
FIGS. 1A-1B are schematic diagrams of an example computing system, in accordance with some implementations.
Figure 1B:
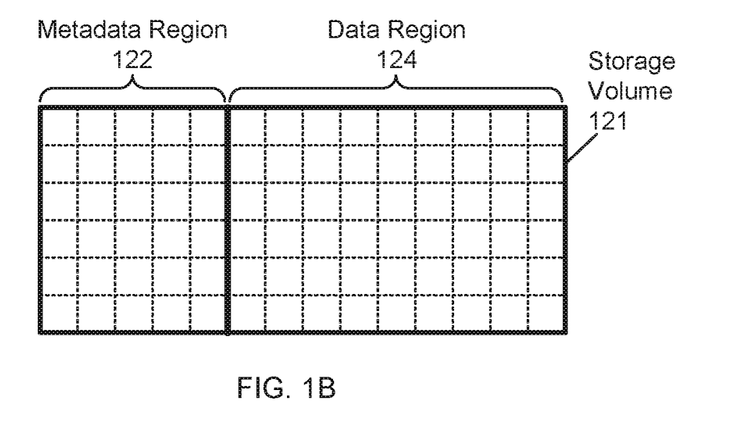

FIGS. 1A-1B—Example System

FIG. 1A shows an example system 100 in accordance with some implementations. As shown, the example system 100 may include a source system 110, a block-level storage device 120, and a filesystem operation (FSO) system 130. The source system 110 may be a physical computing device (e.g., server, appliance, desktop, etc.), a virtual computing device (e.g., virtual machine, container, etc.), and so forth. Further, the block-level storage device 120 may be all or a part of a local storage device, a storage appliance, a storage array, remote storage service, and so forth. In some implementations, the source system 110 and the block-level storage device 120 may be implemented in different devices and/or locations. However, in other implementations, the source system 110 and the block-level storage device 120 may be implemented in a single device and/or system (e.g., a server, a server rack, and so forth).

In some implementations, the block-level storage device 120 may store data blocks in deduplicated form. For example, a storage controller may perform deduplication operations including comparing fingerprints of the incoming data blocks to fingerprints of the stored data blocks. As used herein, the term "fingerprint" refers to a value derived by applying a function on the content of the data block (where the "content" can include the entirety or a subset of the content of the data block). An example of the function that can be applied includes a hash function that produces a hash value based on the incoming data block. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

In some implementations, the block-level storage device 120 may store a filesystem 125 in the form of data blocks. Further, in some implementations, different types of data blocks of the filesystem 125 may be stored in different portions or regions of the block-based storage device 120. Referring now to FIG. 1B, shown is an example storage allocation 121. The storage allocation 121 may illustrate the manner in which the filesystem 125 may use the storage space in the block-level storage device 120 (shown in FIG. 1A). In some implementations, the storage allocation 121 may include a metadata region 122 and a file data region 124. The data region 124 may store filesystem data (i.e., the data content of files in the filesystem). The metadata region 122 may include data blocks that store filesystem metadata (i.e., metadata about files and directories in the filesystem). For example, if the filesystem 125 is a New Technology File System (NTFS), the metadata region 122 may be implemented as a Master File Table (MFT) of the block-based storage device 120. In another example, if the filesystem 125 is an Extended File System (EXT), the metadata region 122 may be implemented as an index node ("inode") table of the block-based storage device 120. Note that, although FIG. 1B illustrates an example storage allocation 121 that only includes one metadata region 122 and one file data region 124, implementations are not limited in this regard. For example, in some implementations, the storage allocation 121 may include multiple metadata regions 122 and multiple file data regions 124 (e.g., at specified locations). In some implementations, the location(s) of the metadata region(s) 122 (e.g., MFT, inode table, etc.) may be determined by an initial scan of the block-based storage device 120, and may be persistently stored in a data structure included in the block-based storage device 120.

Referring again to FIG. 1A, the source system 110 may transmit block level input/output (I/O) requests to the block-level storage device 120. In some implementations, a block level I/O request may include a filesystem operation to be performed on the filesystem 125. As used herein, a block level I/O request may be referred to as "including" a filesystem operation if the block level I/O request is to modify data blocks to perform the filesystem operation. For example, if a particular filesystem operation is to move a data file within the filesystem 125 (e.g., into a different directory), the source system 110 may transmit a particular block level I/O request to modify the data blocks that store metadata recording the location of the data file. Accordingly, the particular block level I/O request may be described herein as including the particular filesystem operation.

In some implementations, the FSO system 130 may include an FSO filter 140, an FSO queue 150, an FSO parser 160, and an FSO database 170. One or more components of the FSO system 130 (e.g., FSO filter 140, FSO parser 160) may be implemented as a processor executing instructions (e.g., software and/or firmware) that are stored in a machine-readable storage medium, in hardware (e.g., circuitry), and so forth. Further, the FSO queue 150 and the FSO database 170 may be implemented using non-transitory storage media (e.g., hard disk drives, solid state drives), semiconductor memory (e.g., random access memory), and so forth. In some implementations, some or all of the components of the FSO system 130 may be implemented in a replication driver, a replication appliance, or a combination thereof. Further, in other implementations, some or all of the components of the FSO system 130 may be implemented in a storage controller of the source system 110, the block-level storage device 120, or another device or system (not shown in FIG. 1A).

In some implementations, the FSO filter 140 may read or "snoop" a block level I/O request transmitted from the source system 110 to the block-level storage device 120. The FSO filter 140 may read and evaluate a relatively small portion (e.g., less than 20%) of the block level I/O request to determine whether the block level I/O request includes a filesystem operation. In some implementations, the portion (evaluated by the FSO filter 140) may be single field or string located at a particular location (e.g., offset and length) within the block level I/O request. For example, the FSO filter 140 may determine whether a prefix (e.g., the leading N characters, where N is an integer) of the block level I/O request matches a predefined string (e.g., "FILE") that is used by commands to write or modify the filesystem metadata. In another example, the FSO filter 140 may read a destination address at a predefined offset and length within the block level I/O request, and may determine whether the destination address matches an address range that is reserved or specified for storing file metadata (e.g., metadata region 122 shown in FIG. 1B).

In some implementations, if the FSO filter 140 indicates that the block level I/O request includes a filesystem operation, a copy of the block level I/O request (also referred to herein as an "I/O request copy") may be stored in the FSO queue 150. Further, the original block level I/O request (i.e., not the I/O request copy added to the FSO queue 150) is transmitted to the block-level storage device 120, and is then executed by the block-level storage device 120. Stated differently, the FSO queue 150 is separate from and external to the execution path of the block level I/O request (i.e., by the block-level storage device 120). The FSO queue 150 may store multiple I/O request copies (i.e., copies of different block level I/O requests identified by the FSO filter 140) for later processing by the FSO parser 160. An example implementation of the FSO queue 150 is described below with reference to FIG. 2A.

In some implementations, the FSO parser 160 may dequeue one of the I/O request copies from the FSO queue 150 in response to a trigger event, and may parse the dequeued I/O request copy. The trigger event may be asynchronous to the execution of the block level I/O request by the block-level storage device 120. For example, the trigger event for the FSO parser 160 may include a determination that the available processing bandwidth of the FSO system 130 exceeds a threshold level (e.g., indicating that a processor of the FSO system 130 is currently idle or has a relatively low workload). In another example, the trigger event may include a determination that the FSO queue 150 has been filled to a predefined level (e.g., a maximum number of queued I/O request copies). Other examples of the trigger event for the FSO parser 160 are possible. In examples described herein, the FSO parser 160 (which is separate from the block-level storage device 120) may parse an I/O request copy as operation(s) separate from and asynchronous to the execution of the block level I/O request by the block-level storage device 120.

In some implementations, the FSO parser 160 may parse the dequeued I/O request copy to extract details of the embedded filesystem operation. For example, the FSO parser 160 may read some or all of the I/O request copy to locate multiple delimiters, and may use the multiple delimiters to extract multiple data fields from the I/O request copy. Further, in some examples, the FSO parser 160 may parse a relatively large portion (e.g., more than 50%) of the dequeued I/O request copy. In some implementations, the extracted details of the filesystem operation may be used to populate an entry of the FSO database 170 that represents that particular filesystem operation. An example implementation of the FSO database 170 is described below with reference to FIG. 2B.

In some implementations, the FSO database 170 may be queried to obtain information regarding changes to the filesystem 125. For example, the FSO database 170 may be queried to determine the number of files that have been changed in a recent time period. If it is determined that the number of changed files exceeds a predefined threshold, an alert may be raised to indicate that a malware attack may be affecting the filesystem 125 (e.g., a ransomware attack is attempting to encrypt all files). In another example, the FSO database 170 may be queried to determine the time period in which a particular file was last changed. Other examples are possible. In this manner, the FSO database 170 may be used to determine changes to the filesystem 125, but without repeated executions of programming to parse and analyze the entire filesystem 125. Note that, while FIG. 1A illustrates an example implementation in which the FSO database 170 is included in the FSO system 130, other implementations are possible. For example, it is contemplated that the FSO database 170 may be located in the source system 110, the block-level storage device 120, in an external system or location (not shown in FIG. 1A), or any combination thereof.

Figure 2A:
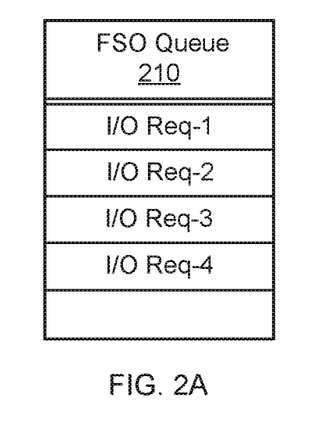
FIGS. 2A-2B are illustrations of example data structures, in accordance with some implementations.
Figure 2B:
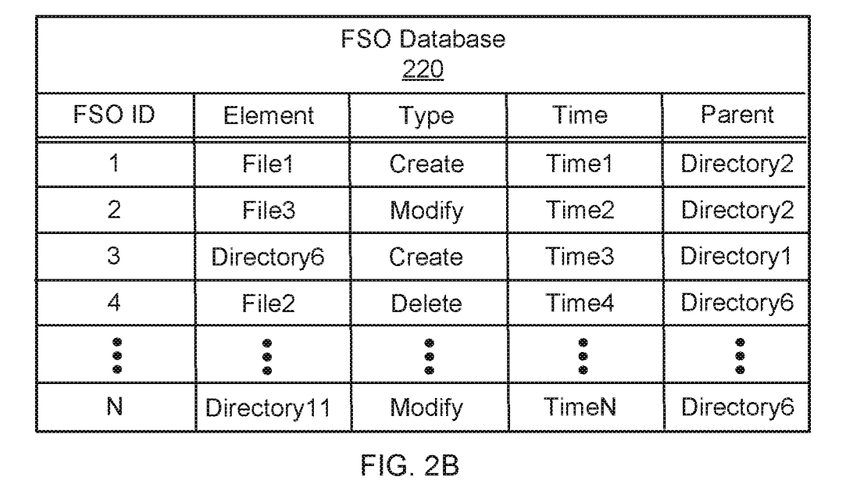

FIGS. 2A-2B—Example Data Structures

FIG. 2A shows an illustration of an example filesystem operation (FSO) queue 210, in accordance with some implementations. The FSO queue 210 may correspond generally to an example implementation of the FSO queue 150 (shown in FIG. 1A). In some implementations, the FSO queue 210 may temporarily store copies of multiple block level I/O requests for later parsing (e.g., by the FSO parser 160 shown in FIG. 1A). Each I/O request may be copied and stored in the FSO queue 210 in response to determining that the I/O request includes a filesystem operation (e.g., by the FSO filter 140 shown in FIG. 1A). In some implementations, the FSO queue 210 may store the I/O request copies in order of arrival (i.e., as added to the FSO queue 210). Further, the I/O request copies may be dequeued in the order that they were added to the FSO queue 210 (e.g., by dequeuing the oldest I/O request copy in the FSO queue 210).

FIG. 2B shows an illustration of an example FSO database 220, in accordance with some implementations. The FSO database 220 may correspond generally to an example implementation of the FSO database 170 (shown in FIG. 1A). In some implementations, the FSO database 220 may store information regarding filesystem operations (FSOs) performed in a block-based storage system (e.g., storage system 100 shown in FIG. 1A). For example, the FSO database 220 may include a table composed of multiple rows, where each row corresponds to a different FSO. Further, each row may include multiple columns, where each column represents a different attribute (i.e., parameter) of the FSO. For example, as illustrated in FIG. 2B, each row may include a "FSO ID" column (i.e., attribute) to record a unique identifier for the FSO, and an "Element" column to identify a particular filesystem element (or elements) affected by the FSO. Further, each row may include a "Type" column to record the type of FSO. For example, the "Type" column may record a file create FSO, directory create FSO, file/directory modify FSO (e.g., rename, move, edit, etc.), file/directory delete FSO, and so forth. Furthermore, each row may include a "Time" column to record the creation time for the row, and a "Parent" column to record the parent of the FSO element (e.g., identified by the "Element" column). Note that, while FIG. 2A, illustrates the FSO database 220 as a table of rows, other data structures are possible. For example, the FSO database 220 may be implemented as delimited text files (e.g., as key-value pairs), may be stored as Extensible Markup Language (XML) files, structured text, delimited text, etc.), may be hard-coded as program instructions, and so forth.

In some implementations, the FSO database 220 may be queried to identify particular changes to a filesystem. For example, the FSO database 220 may be queried to determine when a particular file was changed, to rapidly detect mass changes (e.g., encryptions or deletes) to multiple files resulting from a malware attack, and so forth. In this manner, the FSO database 220 may provide visibility of filesystem changes without repeated executions of programming to parse and analyze the entire filesystem, and may thereby improve the performance of the block-based storage device.

In some implementations, the FSO database 220 may be queried to determine the full address path of each data file. For example, as shown in FIG. 2B, "File2" is included in "Directory6," which in turn is included in "Directory1." Accordingly, the FSO database 220 may be used to queried to determine the address path "C:\Directory1\Directory6\File2." Further, the FSO database 220 may be updated to store the full address paths that are determined for each data file.

FIGS. 3 and 4A-4C—Example Process for Collecting Filesystem Operation Data

Figure 3:
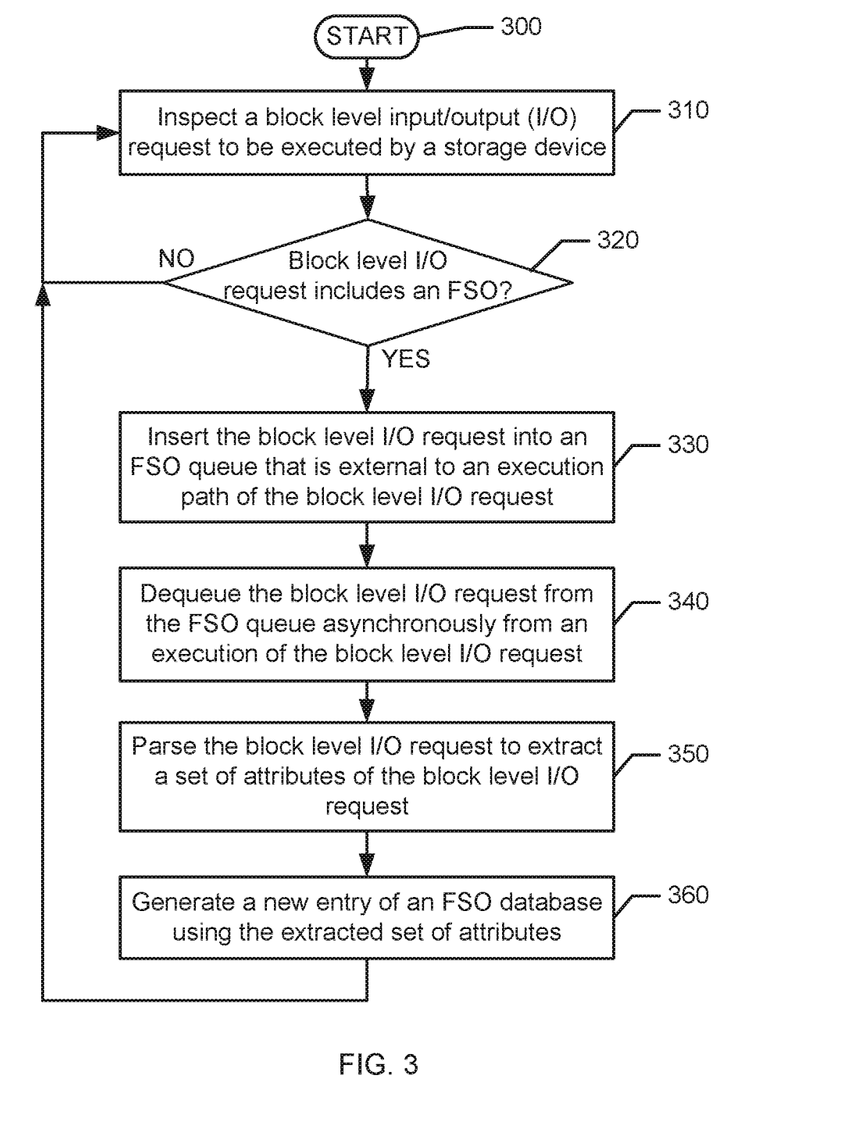
FIG. 3 is an illustration of an example process, in accordance with some implementations.
Figure 4A:
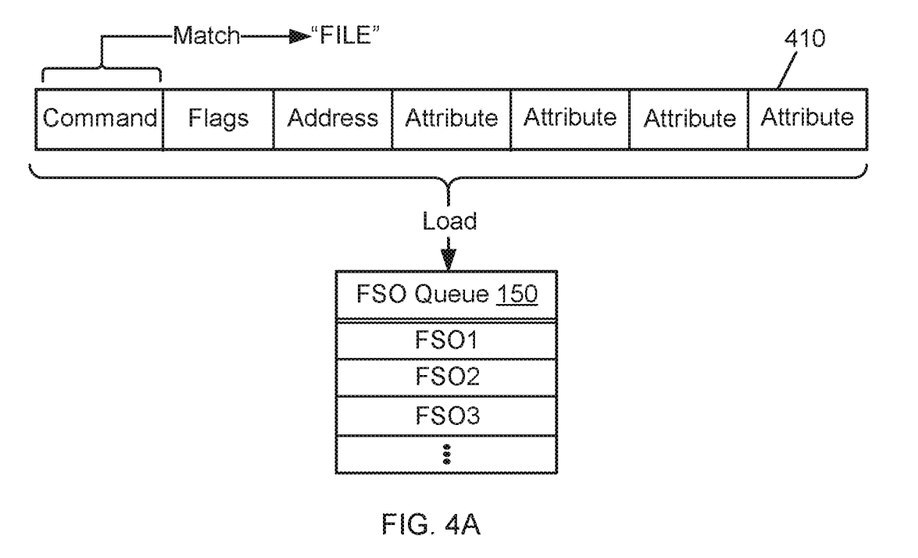
FIGS. 4A-4C are illustrations of example operations, in accordance with some implementations.
Figure 4B:
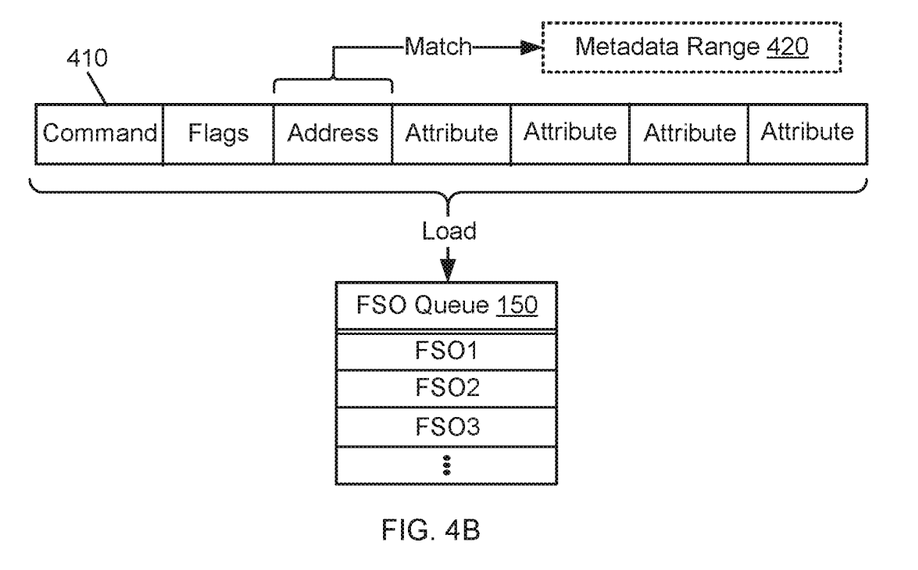
Figure 4C:
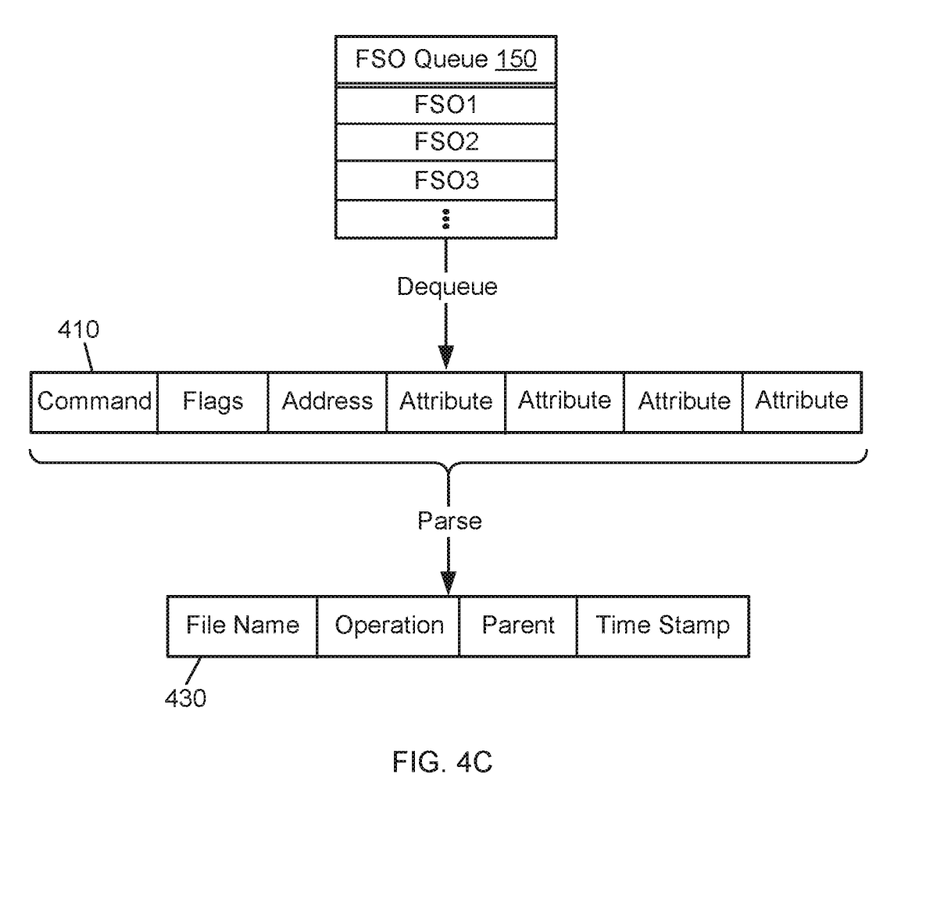

FIG. 3 shows an example process 300 for collecting filesystem operation data, in accordance with some implementations. In some examples, the process 300 may be performed using the filesystem operation (FSO) system 130 (shown in FIG. 1A), which may be separate from the block-level storage device 120. The process 300 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 300 may be described below with reference to FIGS. 1A-1B and 4A-4C, which show some example implementations. However, other implementations are also possible.

Block 310 may include inspecting a block level input/output (I/O) request to be executed by a storage device. For example, referring to FIG. 1A, the FSO filter 140 monitors or "snoops" a block level I/O request that is transmitted from the source system 110 to the block-level storage device 120. In some implementations, the FSO filter 140 reads a single string at a particular location (e.g., offset and length) within the block level I/O request (e.g., a prefix of the block level I/O request, a destination address of the block level I/O request, etc.).

Decision block 320 may include determining whether the block level I/O request includes a filesystem operation (FSO). If not ("NO"), the process 300 may return to block 310 (i.e., to inspect another block level I/O request). Otherwise, if it is determined at decision block 320 that the block level I/O request includes an FSO ("YES"), the process 300 may continue at block 330, including inserting the block level I/O request into an FSO queue that is external to an execution path of the block level I/O request. For example, referring to FIGS. 1A and 4A, the FSO filter 140 reads a prefix of a block level I/O request 410, and matches the prefix to the command identifier "FILE" used for FSOs. Accordingly, the FSO filter 140 determines that the block level I/O request 410 includes an FSO, and in response loads the block level I/O request 410 into the FSO queue 150. In another example, referring to FIGS. 1A and 4B, the FSO filter 140 reads a destination address (e.g., at a specified offset and length) of the block level I/O request 410, and matches the destination address to a predefined metadata address range (e.g., metadata region 122 shown in FIG. 1B). Accordingly, the FSO filter 140 determines that the block level I/O request 410 includes an FSO, and in response loads the block level I/O request 410 into the FSO queue 150.

Block 340 may include dequeuing the block level I/O request from the FSO queue asynchronously from an execution of the block level I/O request. For example, referring to FIGS. 1A and 4C, the FSO parser 160 dequeues the block level I/O request 410 from the FSO queue 150 in response to a trigger event (e.g., upon detection that a controller of the FSO system 130 has a relatively low workload). In some implementations, the trigger event may be asynchronous to the execution of the block level I/O request by the block-level storage device 120. Accordingly, the FSO parser 160 (which is separate from the block-level storage device 120) may parse an I/O request copy as operation(s) separate from and in addition to the execution of the block level I/O request by the block-level storage device 120.

Block 350 may include parsing the block level I/O request to extract a set of attributes of the block level I/O request. Block 360 may include generating a new entry of an FSO database using the extracted set of attributes. After block 360, the process 300 may return to block 310 (i.e., to inspect another block level I/O request). For example, referring to FIGS. 1A and 4C, the FSO parser 160 reads some or all of the dequeued block level I/O request 410 to locate multiple delimiters, and may use the multiple delimiters to extract a set of data fields 430 from the I/O request copy. The extracted set of data fields 430 is populated into an entry of the FSO database 170 that represents the FSO embedded in the block level I/O request 410.

Figure 5:
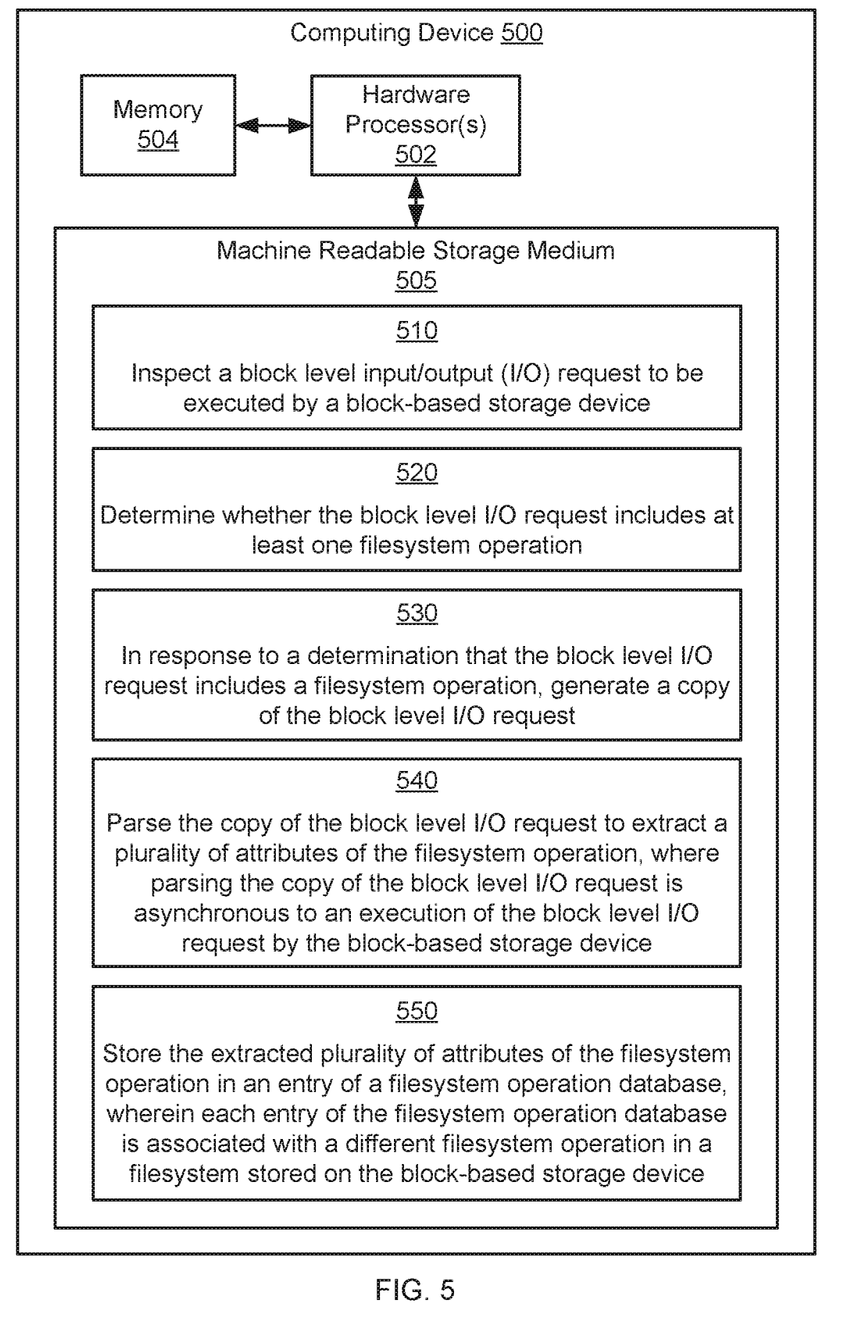
FIG. 5 is a schematic diagram of an example computing device, in accordance with some implementations.

FIG. 5—Example Computing Device

FIG. 5 shows a schematic diagram of an example computing device 500. In some examples, the computing device 500 may correspond generally to some or all of the filesystem operation (FSO) system 130 (shown in FIG. 1A), which may be separate from the block-level storage device 120. As shown, the computing device 500 may include hardware processor 502 and machine-readable storage 505 including instruction 510-550. The machine-readable storage 505 may be a non-transitory medium. The instructions 510-550 may be executed by the hardware processor 502, or by a processing engine included in hardware processor 502.

Instruction 510 may be executed to inspect a block level input/output (I/O) request to be executed by a block-based storage device. Instruction 520 may be executed to determine whether the block level I/O request includes at least one filesystem operation. For example, referring to FIG. 1A, the FSO filter 140 inspects a block level I/O request that is transmitted from the source system 110 to the block-level storage device 120. In some implementations, the FSO filter 140 reads a single string at a particular location (e.g., offset and length) within the block level I/O request.

Instruction 530 may be executed to, in response to a determination that the block level I/O request includes a filesystem operation, generate a copy of the block level I/O request. For example, referring to FIGS. 1A and 4A, the FSO filter 140 reads a prefix of a block level I/O request, and matches the prefix to the command identifier "FILE" used for FSOs. Accordingly, the FSO filter 140 determines that the block level I/O request 410 includes an FSO, and in response loads the block level I/O request 410 into the FSO queue 150. In another example, referring to FIGS. 1A and 4B, the FSO filter 140 reads a destination address (e.g., at a specified offset and length) of the block level I/O request 410, and matches the destination address to a predefined metadata address range (e.g., metadata region 122 shown in FIG. 1B). Accordingly, the FSO filter 140 determines that the block level I/O request 410 includes an FSO, and in response loads the block level I/O request 410 into the FSO queue 150.

Instruction 540 may be executed to parse the copy of the block level I/O request to extract a plurality of attributes of the filesystem operation, wherein parsing the copy of the block level I/O request is separate from and asynchronous to an execution of the block level I/O request by the block-based storage device. For example, referring to FIGS. 1A and 4C, the FSO parser 160 dequeues the block level I/O request 410 from the FSO queue 150 in response to a trigger event, and parses a relatively large portion (e.g., more than 50%) of the dequeued I/O request copy to extract details of the embedded filesystem operation. For example, the FSO parser 160 may read some or all of the I/O request copy to locate multiple delimiters, and may use the multiple delimiters to extract multiple data fields from the I/O request copy.

Instruction 550 may be executed to store the extracted plurality of attributes of the filesystem operation in an entry of a filesystem operation database, where each entry of the filesystem operation database is associated with a different filesystem operation in a filesystem stored on the block-based storage device. For example, referring to FIGS. 1A and 4C, the FSO parser 160 uses the data fields (extracted from the I/O request copy) to populate an entry of the FSO database 170 that represents the filesystem operation.

Figure 6:
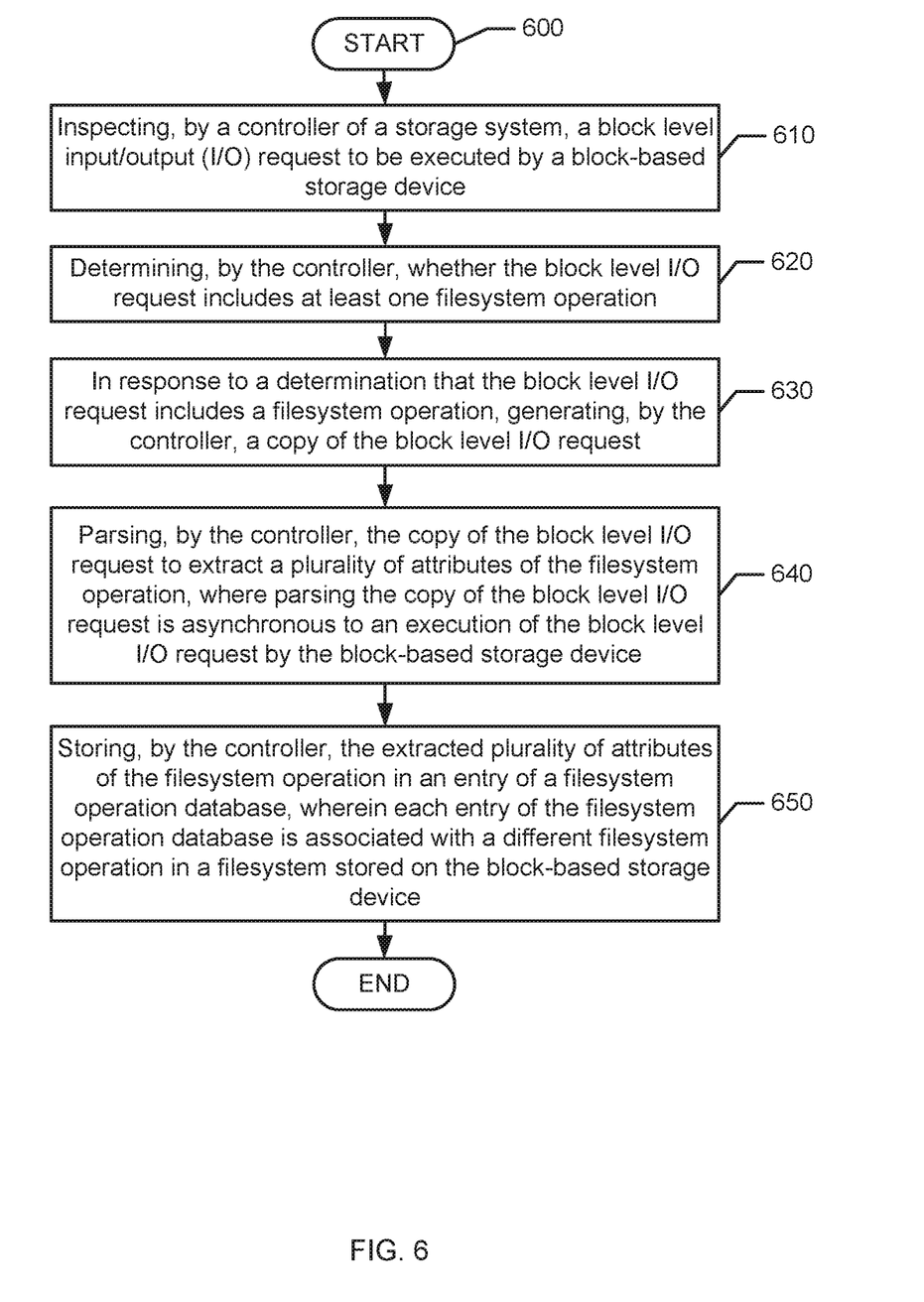
FIG. 6 is an illustration of an example process, in accordance with some implementations.

FIG. 6—Example Process

FIG. 6 shows an example process 600 for collecting filesystem operation data, in accordance with some implementations. In some examples, the process 600 may be performed using the filesystem operation (FSO) system 130 (shown in FIG. 1A), which may be separate from the block-level storage device 120. The process 600 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 610 may include inspecting, by a controller of a storage system, a block level input/output (I/O) request to be executed by a block-based storage device. Block 620 may include determining, by the controller, whether the block level I/O request includes at least one filesystem operation. Block 630 may include, in response to a determination that the block level I/O request includes a filesystem operation, generating, by the controller, a copy of the block level I/O request.

Block 640 may include parsing, by the controller, the copy of the block level I/O request to extract a plurality of attributes of the filesystem operation, where parsing the copy of the block level I/O request is separate from and asynchronous to an execution of the block level I/O request by the block-based storage device. Block 650 may include storing, by the controller, the extracted plurality of attributes of the filesystem operation in an entry of a filesystem operation database, where each entry of the filesystem operation database is associated with a different filesystem operation in a filesystem stored on the block-based storage device.

Figure 7:
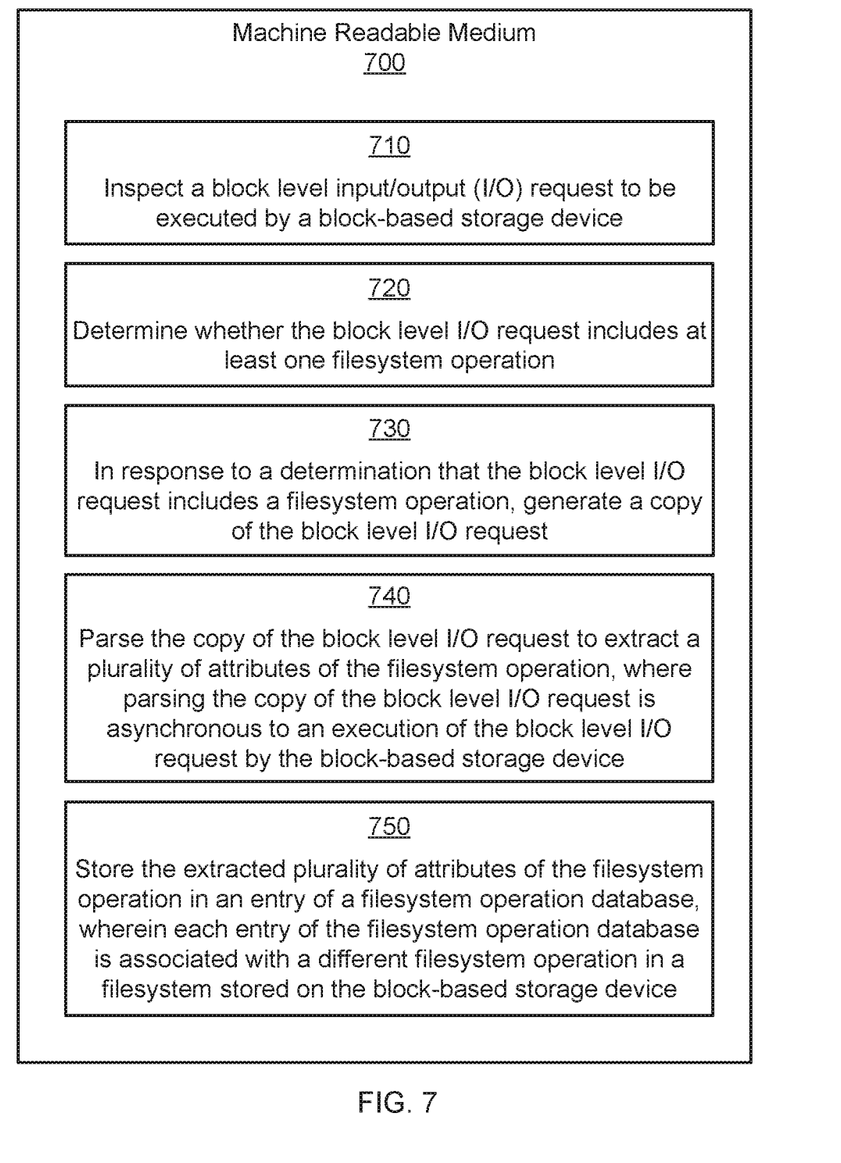
FIG. 7 is a diagram of an example machine-readable medium storing instructions in accordance with some implementations.

FIG. 7—Example Machine-Readable Medium

FIG. 7 shows a machine-readable medium 700 storing instructions 710-750, in accordance with some implementations. The instructions 710-750 can be executed by a single processor, multiple processors, a single processing engine, multiple processing engines, and so forth, which may be separate from a block-level storage device to execute block level I/O requests as described herein. The machine-readable medium 700 may be a non-transitory storage medium, such as an optical, semiconductor, or magnetic storage medium.

Instruction 710 may be executed to inspect a block level input/output (I/O) request to be executed by a block-based storage device. Instruction 720 may be executed to determine whether the block level I/O request includes at least one filesystem operation. Instruction 730 may be executed to, in response to a determination that the block level I/O request includes a filesystem operation, generate a copy of the block level I/O request.

Instruction 740 may be executed to parse the copy of the block level I/O request to extract a plurality of attributes of the filesystem operation, where parsing the copy of the block level I/O request is asynchronous to an execution of the block level I/O request by the block-based storage device. Instruction 750 may be executed to store the extracted plurality of attributes of the filesystem operation in an entry of a filesystem operation database, where each entry of the filesystem operation database is associated with a different filesystem operation in a filesystem stored on the block-based storage device.

In accordance with some implementations described herein, a controller may inspect a block level I/O request being sent to a block-based storage device, and may determine whether the block level I/O request includes a filesystem operation. Upon determining that the block level I/O request includes a filesystem operation, the block level I/O request is copied into a queue. The controller may dequeue the copy of the block level I/O request asynchronously from the execution of the block level I/O request. Further, the controller may parse the dequeued copy of block level I/O request to extract details of the included filesystem operation. The controller may then add the extracted information to a database of filesystem changes. Subsequently, the database may be queried to identify particular changes to the filesystem. In this manner, the database may provide visibility of filesystem changes without repeated executions of programming to parse and analyze the entire filesystem, and may thereby improve the performance of the block-based storage device.

Note that, while FIGS. 1A-7 show various examples, implementations are not limited in this regard. For example, referring to FIG. 1A, it is contemplated that the system 100 may include additional devices and/or components, fewer components, different components, different arrangements, and so forth. In another example, it is contemplated that the functionality of the FSO system 130 described above may be included in any another engine or software of the system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing system comprising:
    a processor; and
    a machine-readable storage storing instructions, the instructions executable by the processor to:
        inspect a block level input/output (I/O) request to be executed by a block-based storage device;
        determine whether the block level I/O request includes at least one filesystem operation;
        in response to a determination that the block level I/O request includes a filesystem operation, generate a copy of the block level I/O request;
        parse the copy of the block level I/O request to extract a plurality of attributes of the filesystem operation, wherein parsing the copy of the block level I/O request is asynchronous to an execution of the block level I/O request by the block-based storage device; and
        store the extracted plurality of attributes of the filesystem operation in an entry of a filesystem operation database, wherein each entry of the filesystem operation database stores a set of attributes for a different filesystem operation in a filesystem stored on the block-based storage device, and wherein each entry of the filesystem operation database stores a timestamp for the filesystem operation associated with that entry.

2. The computing system of claim 1, including instructions executable by the processor to:
    determine whether a prefix of the block level I/O request matches a first text string associated with the filesystem operation; and
    in response to a determination that the prefix of the block level I/O request matches the first text string, determine that the block level I/O request includes the filesystem operation.

3. The computing system of claim 1, including instructions executable by the processor to:
    determine a first storage location specified in the block level I/O request; and
    in response to a determination that the first storage location overlaps with a metadata address range of the block-based storage device, determine that the block level I/O request includes the filesystem operation.

4. The computing system of claim 1, including instructions executable by the processor to, prior to parsing the block level I/O request:
    store the copy of the block level I/O request in a queue; and
    dequeue the block level I/O request from the queue in response to a detection of a trigger event, wherein the trigger event is asynchronous to the execution of the block level I/O request.

5. The computing system of claim 4, wherein the trigger event is a determination that an available processing bandwidth of the computing device exceeds a threshold level.

6. The computing system of claim 4, wherein the trigger event is a determination that the queue has been filled to a predefined level.

7. The computing system of claim 1, wherein the filesystem operation is one selected from a create file operation, a change file operation, and a delete file operation.

8. The computing system of claim 1, wherein each entry of the filesystem operation database stores:
    an operation identifier for the filesystem operation associated with that entry;
    an element identifier for a filesystem element affected by the filesystem operation associated with that entry; and
    an operation type indicator for the filesystem operation associated with that entry.

9. A non-transitory machine-readable medium storing instructions that upon execution cause a processor to:
    inspect a block level input/output (I/O) request to be executed by a block-based storage device;
    determine whether the block level I/O request includes at least one filesystem operation;
    in response to a determination that the block level I/O request includes a filesystem operation, generate a copy of the block level I/O request;
    parse the copy of the block level I/O request to extract a plurality of attributes of the filesystem operation, wherein parsing the copy of the block level I/O request is asynchronous to an execution of the block level I/O request by the block-based storage device; and
    store the extracted plurality of attributes of the filesystem operation in an entry of a filesystem operation database, wherein each entry of the filesystem operation database is stores a set of attributes for a different filesystem operation in a filesystem stored on the block-based storage device, and wherein each entry of the filesystem operation database stores a timestamp for the filesystem operation associated with that entry.

10. The non-transitory machine-readable medium of claim 9, including instructions that upon execution cause the processor to:
    determine whether a prefix of the block level I/O request matches a first text string associated with the filesystem operation; and in response to a determination that the prefix of the block level I/O request matches the first text string, determine that the block level I/O request includes the filesystem operation.

11. The non-transitory machine-readable medium of claim 9, including instructions that upon execution cause the processor to:
   determine a first storage location specified in the block level I/O request; and
   in response to a determination that the first storage location overlaps with a metadata address range of the block-based storage device, determine that the block level I/O request includes the filesystem operation.

12. The non-transitory machine-readable medium of claim 9, including instructions that upon execution cause the processor to, prior to parsing the block level I/O request:
   store the copy of the block level I/O request in a queue; and
   dequeue the block level I/O request from the queue in response to a detection of a trigger event, wherein the trigger event is asynchronous to the execution of the block level I/O request.

13. The non-transitory machine-readable medium of claim 12, wherein the trigger event is a determination that an available processing bandwidth of the computing device exceeds a threshold level.

14. The non-transitory machine-readable medium of claim 9, wherein each entry of the filesystem operation database stores:
   an operation identifier for the filesystem operation associated with that entry;
   an element identifier for a filesystem element affected by the filesystem operation associated with that entry; and
   an operation type indicator for the filesystem operation associated with that entry.

15. A method comprising:
   inspecting, by a controller of a storage system, a block level input/output (I/O) request to be executed by a block-based storage device;
   determining, by the controller, whether the block level I/O request includes at least one filesystem operation;
   in response to a determination that the block level I/O request includes a filesystem operation, generating, by the controller, a copy of the block level I/O request;
   parsing, by the controller, the copy of the block level I/O request to extract a plurality of attributes of the filesystem operation, wherein parsing the copy of the block level I/O request is asynchronous to an execution of the block level I/O request by the block-based storage device; and
   storing, by the controller, the extracted plurality of attributes of the filesystem operation in an entry of a filesystem operation database, where each entry of the filesystem operation database stores a set of attributes for a different filesystem operation in a filesystem stored on the block-based storage device, and wherein each entry of the filesystem operation database stores a timestamp for the filesystem operation associated with that entry.

16. The method of claim 15, comprising:
   determining whether a prefix of the block level I/O request matches a first text string associated with the filesystem operation; and
   in response to a determination that the prefix of the block level I/O request matches the first text string, determining that the block level I/O request includes the filesystem operation.

17. The method of claim 15, comprising:
   determining a first storage location specified in the block level I/O request; and
   in response to a determination that the first storage location overlaps with a metadata address range of the block-based storage device, determining that the block level I/O request includes the filesystem operation.

18. The method of claim 15, comprising, prior to parsing the block level I/O request:
   storing the copy of the block level I/O request in a queue; and
   dequeuing the block level I/O request from the queue in response to a detection of a trigger event, wherein the trigger event is asynchronous to the execution of the block level I/O request.

19. The method of claim 18, wherein the trigger event is a determination that an available processing bandwidth of the computing device exceeds a threshold level.

20. The method of claim 15, wherein each entry of the filesystem operation database stores:
   an operation identifier for the filesystem operation associated with that entry;
   an element identifier for a filesystem element affected by the filesystem operation associated with that entry; and
   an operation type indicator for the filesystem operation associated with that entry.

* * * * *